United States Patent
McClelland et al.

(10) Patent No.: US 9,342,103 B2
(45) Date of Patent: May 17, 2016

(54) HINGED BEZEL HAVING A PORTABLE DISPLAY DOCK

(75) Inventors: Belgie B McClelland, Tomball, TX (US); Kevin D Conn, Montgomery, TX (US); Kelly K Smith, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 631 days.

(21) Appl. No.: 13/173,500

(22) Filed: Jun. 30, 2011

(65) Prior Publication Data
US 2013/0007329 A1 Jan. 3, 2013

(51) Int. Cl.
*G06F 1/16* (2006.01)
*G06F 1/18* (2006.01)

(52) U.S. Cl.
CPC .............. *G06F 1/1632* (2013.01); *G06F 1/181* (2013.01)

(58) Field of Classification Search
CPC ........ G06F 1/1632; G06F 1/33; H05K 7/1494
USPC ........................ 361/679.02, 679.06, 679.09, 361/679.27–679.3, 679.41; 710/303
See application file for complete search history.

(56) References Cited

U.S. PATENT DOCUMENTS

| | | | | |
|---|---|---|---|---|
| 5,436,792 | A * | 7/1995 | Leman ................. | F16M 11/041 16/326 |
| 5,640,296 | A * | 6/1997 | Bonsall et al. ........... | 361/679.27 |
| 5,982,884 | A * | 11/1999 | Hoffmann ..................... | 379/446 |
| 6,003,008 | A * | 12/1999 | Postrel et al. ..................... | 705/4 |
| 6,185,092 | B1 * | 2/2001 | Landrum et al. ......... | 361/679.11 |
| 6,654,816 | B1 * | 11/2003 | Zaudtke et al. .................... | 710/1 |
| 7,149,078 | B2 * | 12/2006 | Schedivy ...................... | 348/827 |
| 7,474,229 | B2 * | 1/2009 | Franz et al. ................ | 340/815.4 |
| 7,729,113 | B2 | 6/2010 | Olesiewicz et al. | |
| 8,325,485 | B2 * | 12/2012 | Haugen et al. ................ | 361/728 |
| 2003/0221876 | A1 * | 12/2003 | Doczy et al. ............... | 178/18.01 |
| 2006/0067036 | A1 * | 3/2006 | Lin et al. ........................ | 361/681 |
| 2006/0109388 | A1 * | 5/2006 | Sanders et al. ................ | 348/837 |
| 2007/0035873 | A1 * | 2/2007 | Hall et al. .................. | 360/97.02 |
| 2007/0255114 | A1 * | 11/2007 | Ackermann et al. .......... | 600/300 |
| 2008/0158792 | A1 * | 7/2008 | Itoh ..................... | B60R 11/0205 361/724 |
| 2008/0273297 | A1 * | 11/2008 | Kumar .......................... | 361/680 |
| 2009/0292851 | A1 * | 11/2009 | Mead et al. .................... | 710/303 |
| 2009/0323568 | A1 * | 12/2009 | Hoffmann et al. ............ | 370/310 |
| 2010/0244641 | A1 | 9/2010 | Bergesch et al. | |
| 2010/0251827 | A1 * | 10/2010 | Bourbeau et al. ............... | 73/756 |
| 2012/0068832 | A1 * | 3/2012 | Feldstein et al. ............. | 340/12.5 |

OTHER PUBLICATIONS http://techpubs.sgi.com/library/tpl/cgi-bin/getdoc.ogi/linus/bks/SGI_EndUser/books/GC_Hdwr_Hdwr_UG/sgi_html/ch04.html#LE11161-PARENT, Ch. 4., Aug. 30, 2011.
http://techpubs.sgi.com/library/tpl/cgi-bin/getdoc.cgi?coll=hdwr&db=bks&Inams=/SGI_EndUser/1450_UG/ch01.html, Ch 1, Jun. 2, 2000.
http://techpubs.sgi.com/library/tpl/cgi-bin/getdoc.cgi?coll=hdwr&db=bks&fname=/SGI_EndUser/Onyx300_UG/ch02.html, Ch 2, May 10, 2002.

* cited by examiner

*Primary Examiner* — Tuan T Dinh
*Assistant Examiner* — Mukund G Patel
(74) *Attorney, Agent, or Firm* — Hewlett Packard Enterprise Patent Department

(57) ABSTRACT

A bezel includes a dock for a portable display device. The bezel also includes a hinge component that, when coupled to an enclosure, allows the bezel to be rotatably moved with respect to the enclosure.

21 Claims, 6 Drawing Sheets

HINGED BEZEL HAVING A PORTABLE DISPLAY DOCK

BACKGROUND

In the art of electronic systems, it is common to house electronic components in an enclosure. Often status information is relayed from the electronic components within the enclosure to various display devices that are visible from outside the enclosure. For example, a computer system may provide an external indication to an operator that an operating temperature has exceeded a threshold, or a power supply voltage is not within a desired range.

External indications may take various forms. For example, the indication mechanism could be implemented as a simple indictor light. Conversely, the indication mechanism could be implemented as a display screen.

BRIEF DESCRIPTION OF THE DRAWINGS

The Figures depict examples, implementations, and configurations.

DETAILED DESCRIPTION

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom.

Examples relate to a hinged bezel that includes a dock for a portable display device. In one example, the bezel is coupled to a computer system enclosure. Since the bezel is hinged, the bezel may be rotated to expose other components accessible from the computer system enclosure. Since the bezel includes a dock for a portable display device, computer system costs may be minimized by not providing a display device for each enclosure, while providing the ability to receive detailed information using a display device. For example, in a data center, a server computer system could signal that attention is needed by flashing an indicator light, and thereafter an operator could couple the portable display device to the dock of the bezel to diagnose the problem.

Figure 1:
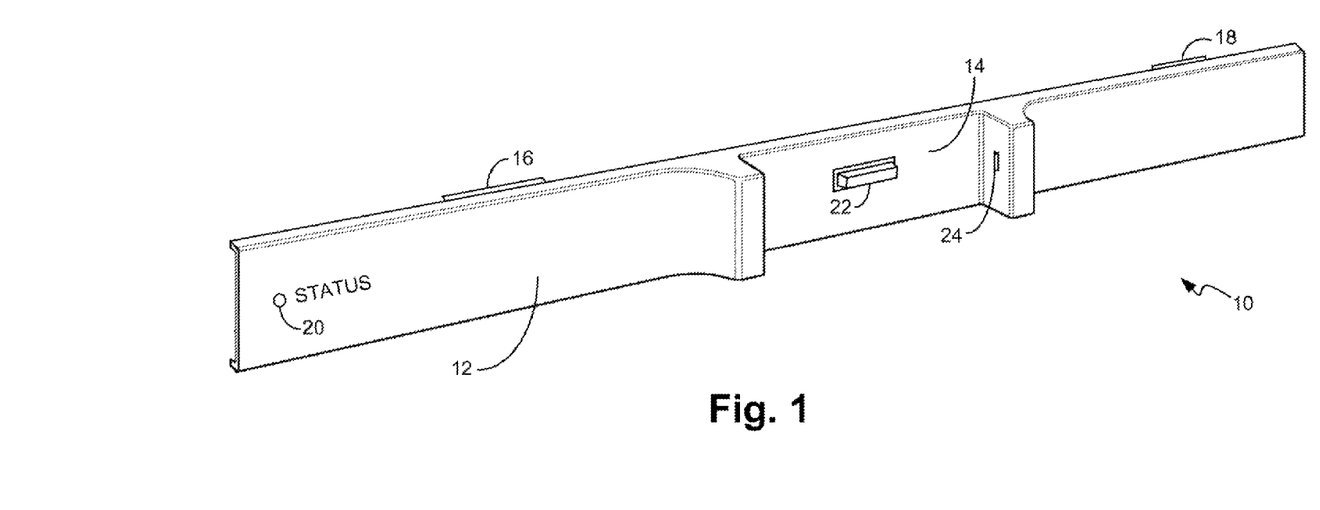
FIG. 1 is a perspective view showing an example of a bezel that includes a portable device display dock and hinge components.

FIG. 1 is a perspective view showing an example bezel 10. Bezel 10 includes a faceplate 12, a portable device display dock 14, hinge components 16 and 18, and indicator light 20. Portable device display dock 14 includes dock connector 22 and retainment mechanism 24.

Hinge components 16 and 18 cooperate with corresponding hinge components of an enclosure to allow bezel 10 to rotate with respect to the enclosure, as will be seen in later figures. Note that hinge components 16 and 18 are merely exemplary, and many types of hinge mechanisms are known in the art. Indicator light 20 represents any indicator light or lights that may be provided. Note that it is also known to provide audible alarms.

Dock connector 22 provides any signals that are needed by the portable display device, including power and data connections. Connector 22 may also participate in providing alignment registration and retainment stability. Retainment mechanism 24 represents any retainment mechanism suitable for retaining a portable display device in dock 14. For example, retainment mechanism could be implemented as spring-loaded members having a cylindrical shape that engages corresponding engagement notches on a portable display device. Such a configuration would allow a portable display device to snap into dock 14 and mate with connector 22.

Figure 2:
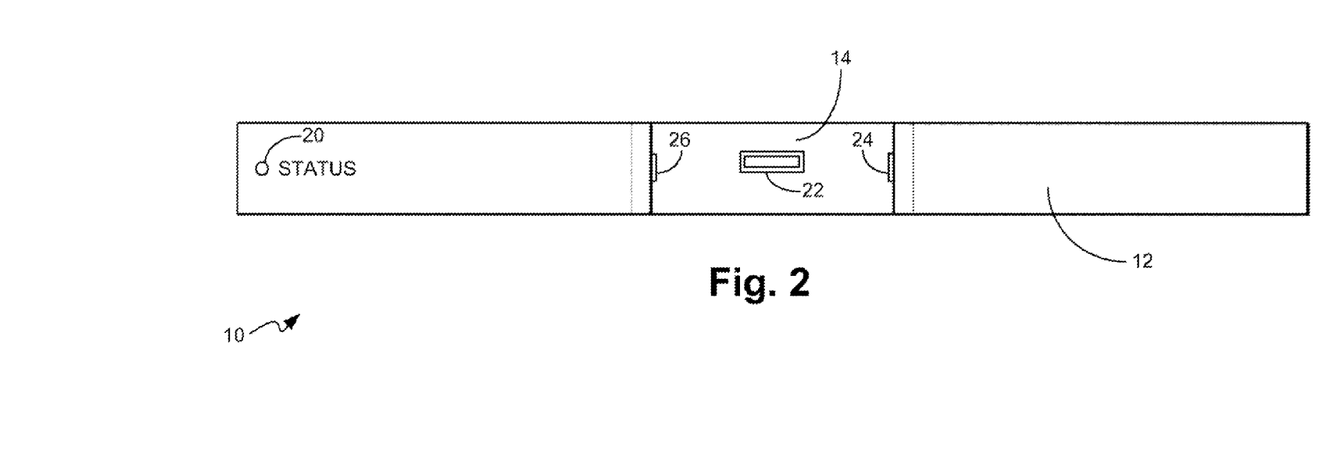
FIG. 2 is a front view of the bezel shown in FIG. 1.

FIG. 2 is a front view of bezel 10 of FIG. 1. In addition to retainment mechanism 24, FIG. 2 shows retainment mechanism 26. Note that one or both of mechanisms 24 and 26 can be spring loaded. Alternatively, mechanisms 24 and 26 could be fixed, with a movable engagement member provided in the portable display device. As mentioned above, many suitable retainment mechanisms are known in the art.

Figure 3:
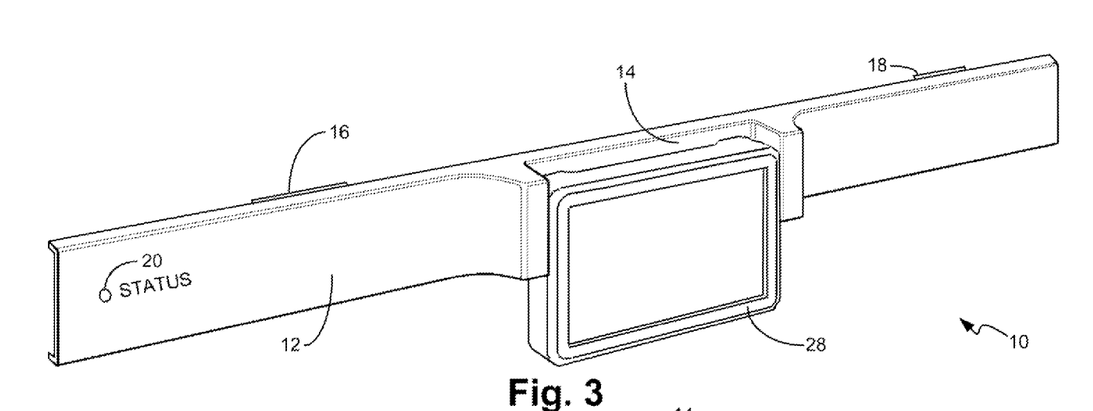
FIG. 3 is a perspective view showing the bezel of FIG. 1 with a portable display device mounted in the portable display dock.
Figure 4:
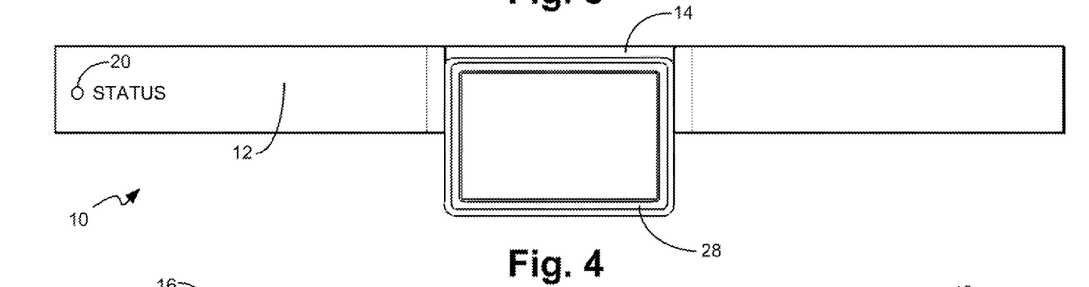
FIG. 4 is a front view of the bezel and the portable display device shown in FIG. 3.

FIG. 3 is a perspective view showing bezel 10 of FIG. 1 with portable display device 28 mounted in dock 14. FIG. 4 is a front view of bezel 10 and portable display device 28 shown in FIG. 3.

Figure 5:
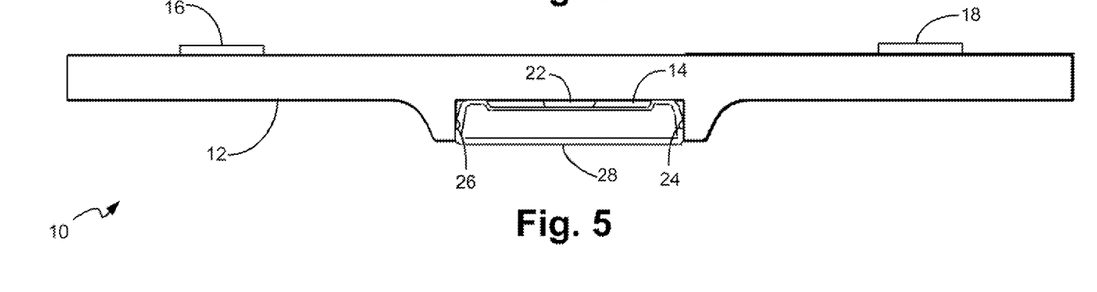
FIG. 5 is a top view showing the bezel and the portable display device of FIGS. 3 and 4.

FIG. 5 is a top view showing bezel 10 and portable display device 28 of FIGS. 3 and 4. Also visible in FIG. 5 are retainment mechanisms 24 and 26 engaging portable display device 28, and connector 22 providing a combination of power and data connections between bezel 10 and device 28.

Figure 6:
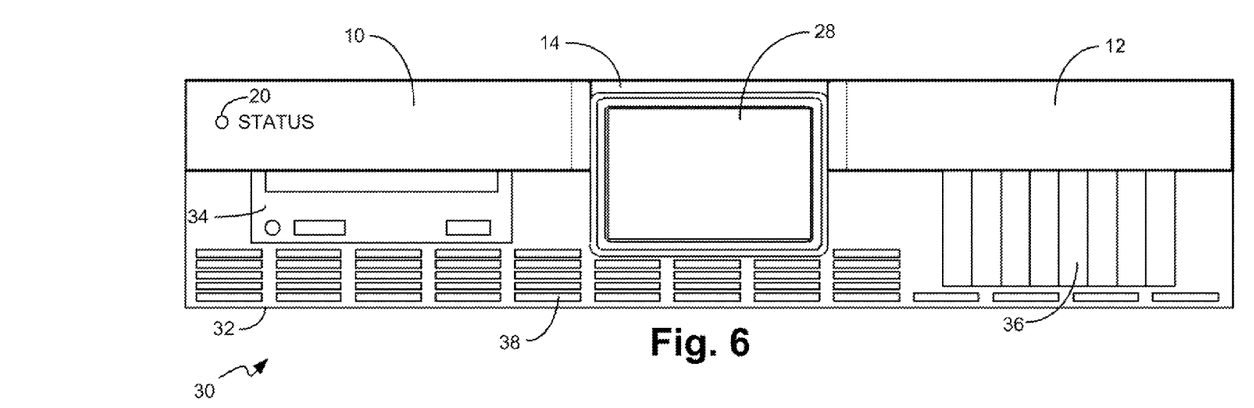
FIG. 6 shows an example computer system provided with a bezel and a portable display device.

FIG. 6 shows an example computer system 30 provided with bezel 10 and portable display device 28, as shown in previous figures. Computer system 30 includes an enclosure 32. Also shown are vent openings 38, optical drive 34, and eight storage devices, such as storage device 36. Note that as shown in FIG. 6, bezel 10 blocks access to optical drive 34 and the storage devices, such as storage device 36.

Figure 7:
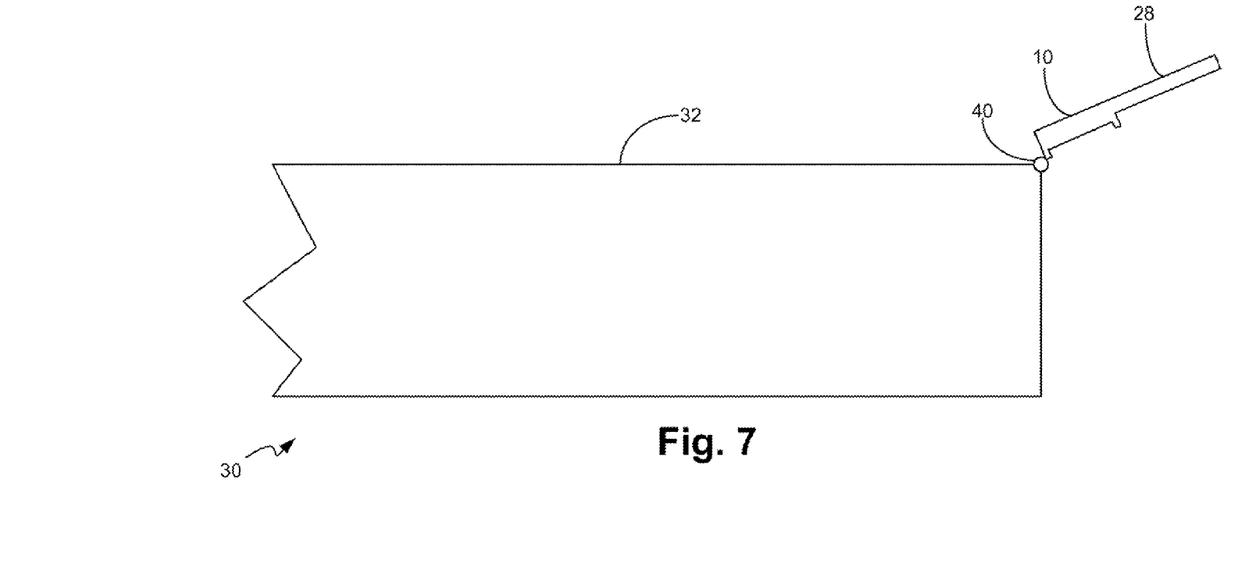
FIG. 7 is a side view of the computer system of FIG. 6, with the bezel and the portable device rotated upward via a hinge.

FIG. 7 is a side view of computer system 30, with bezel 10 and portable device 28 rotated upward via hinge 40, which includes hinge components 16 and 18 shown in previous figures. Note that a user may simply hold bezel 10 open to access components that are behind bezel 10 when bezel 10 is in the down position. Alternatively, hinge 40 may be provided with a mechanism that retains hinge 40 in an open position, or another mechanism may be used, such as a folding support arm. Many suitable methods for holding a door open are known in the art.

Figure 8:
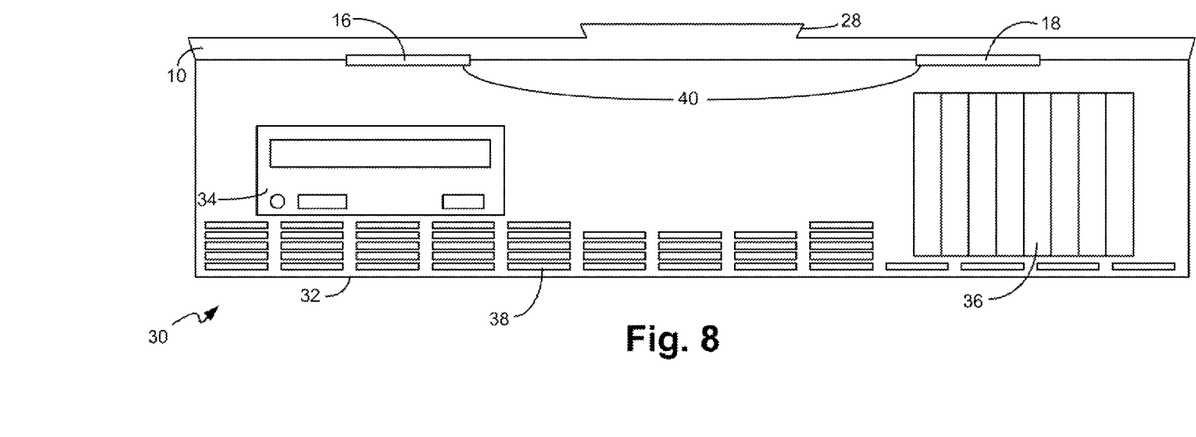
FIG. 8 is a front view of the computer system of FIGS. 6 and 7 with the bezel in an open position.

FIG. 8 is a front view of computer system 30 with bezel 10 in an open position. Accordingly, with bezel 10 open, access to optical drive 34 and the storage devices, such as storage device 36, is provided. Although portable display device 28 is shown in FIGS. 6-8, one can appreciate that rotation of bezel 10 using hinge 40 also provides access when portable display device 28 is not provided in dock 14. Also note that a bezel could be configured to rotate downward to provide access to components available at the front of enclosure 32.

Figure 9:
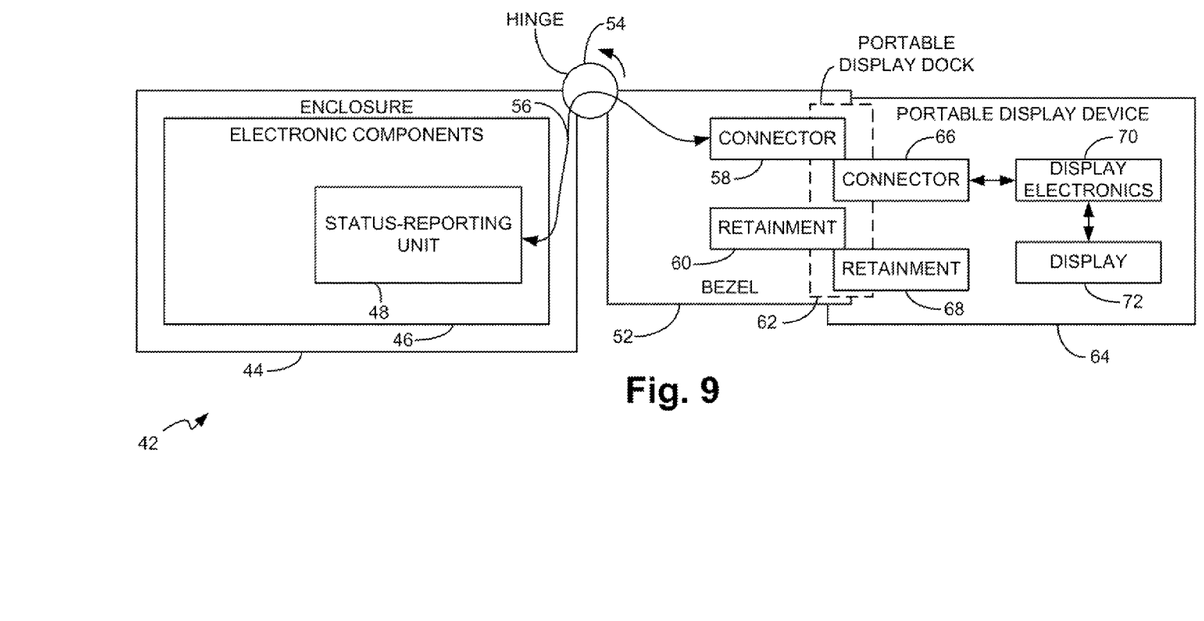
FIG. 9 shows a block diagram of a system.

FIG. 9 shows a block diagram of a system 42. System 42 comprises an enclosure 44 and electronic components 46. Included in electronic components 46 is status-reporting unit 48.

Bezel 52 is coupled to enclosure 44 via hinge 54, and a flex circuit 56 couples status-reporting unit 48 to connector 58 of bezel 52. Bezel 52 also includes retainment 60. Connector 58 and retainment 60 extend into portable display dock 62.

Portable display device 64 is docked at portable display dock 62, with connector 66 of device 64 engaging connector 58 of bezel 52, and retainment 68 of device 64 engaging retainment 60 of bezel 52.

Connector 66 is coupled to display electronics 70, which in turn is coupled to display 72. Accordingly, a communication path is provided from status-reporting unit 48 through flex circuit 56 and connectors 58 and 66 to display electronics 70, which drives display 72. Accordingly, status-reporting unit 48 is able to display status information on display 72.

Figure 10:
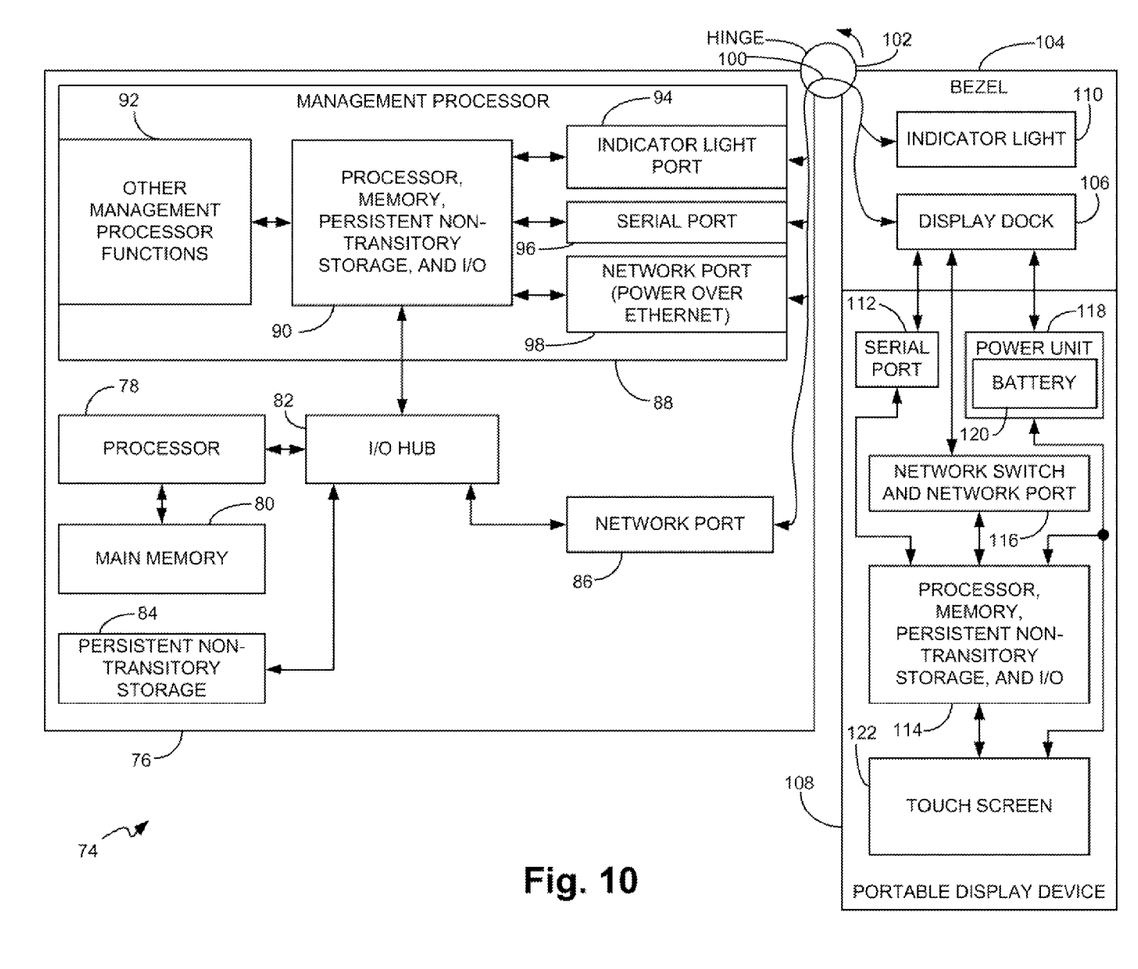
FIG. 10 is a block diagram of computer system.

System 42 may represent a relatively simple implementation where portable display device 64 provides basic display functionality for status-reporting unit 48. FIG. 10 illustrates an example where a portable display device assumes a larger role and may function as a terminal.

FIG. 10 is a block diagram of computer system 74. Computer system 74 includes an enclosure 76, and within the enclosure are processor 78, main memory 80, I/O hub 82, persistent non-transitory storage 84, network port 86, and management processor 88. Management processor 88 includes processor, memory, persistent non-transitory storage, and I/O 90, other management processor functions 92, indicator light port 94, serial port 96, and network port 98, which is a Power over Ethernet (PoE) port. PoE is able to provide up to 25.5 watts of power, so it is well suited to provide both power and data to a portable display device.

In the art of computing, it is common for a workstation or server computer to include a management processor. A management processor may also be known by other names, including a baseboard management controller and a service processor. Typically, the management processor manages lower level functions for the computer system. For example, the management processor may include temperature monitoring, fan controllers, and power monitoring. The management processor may also facilitate the hot-swapping of various components of the computer system. Finally, the management processor may participate in various out-of-band management schemes, such as Lights Out Management. In accordance with the examples illustrated by FIG. 10, management processor 88 may interact with a portable display device.

When configuring a computer system with a management processor, often the management processor will be configured first, and in turn, the management processor may perform further configuration tasks for the rest of the computer system. One common way to configure a management processor is to initially connect a management terminal to a serial port of the management processor and configure various network parameters, such as the whether the management processor should use Dynamic Host Configuration Protocol (DHCP). For a manual configuration that does not use DHCP, parameters such as the IP address, subnet mask, DNS servers, and the default gateway need to be configured. Typically, initial communication between the management terminal and the management processor will occur using a terminal data stream (TDS) comprising characters and various control codes. For example, XTerm, ANSI, VT100, and other protocols based on the VTXX family of terminals are all common TDS formats known in the art, and there are many others.

Once the network configuration of the management processor has been established, the management processor may communicate via a network port.

Returning to FIG. 10, network port 86, and indicator light port 94, serial port 96, and network port 98 of management processor 88 are all coupled to flex circuit 100. Hinge 102 couples enclosure 76 to bezel 104, and display dock 106 of bezel 104 is coupled to portable display device 108. Note that bezel 104 includes indicator light 110, which is coupled to indicator light port 94 of management processor 88 via flex circuit 100.

While the example implementation of portable display device 64 shown in FIG. 9 is relatively simple, portable display device 108 is more complex. In one example, portable display device 108 may be implemented as a sophisticated tablet device running a suitable operating system, such as the webOS operating system, which is a product of Hewlett-Packard Company. Of course, other suitable operating systems may be used.

Serial port 112 of portable display device 108 is coupled to serial port 96 of management processor 88 via flex cable 100. In turn, serial port 112 is coupled to processor, memory, persistent non-transitory storage, and I/O 114 of portable display device 108.

Network switch and network port 116 is coupled to network port 98 of management processor 88 and network port 86 via flex cable 100. In turn, network switch and network port 116 is coupled to processor, memory, persistent non-transitory storage, and I/O 114 of portable display device 108.

Power unit 118 of portable display device 108 is coupled to network port 98 of management processor 88. As mentioned above, port 98 is a PoE port capable of providing power to portable display device 108. Of course, a separate power connection could also be provided from enclosure 76. Power unit 118 includes a battery. In one example, the battery may be charged while portable display device 108 is docked to bezel 104. The battery may be used to power portable display device 108 if device 108 is removed from bezel 104 and used as a handheld device. Power unit 118 provides power to processor, memory, persistent non-transitory storage, and I/O 114 and touch screen 122.

Touch screen 122 is coupled to processor, memory, persistent non-transitory storage, and I/O 114. Touch screen 122 functions as an I/O device, and can relay user inputs to components in enclosure 76 and can display information provided by components in enclosure 76.

In the example shown in FIG. 10, data may be provided to portable display device 108 via three different paths. The first path is from network port 86, the second path is from network port 98, and the third path is from serial port 96. In one example, the path is selectable from portable display device 108.

By accessing network port 86, portable display device 108 has access to the functions of computer system 74, and can interact with workloads being executed by processor 78 from main memory 80, with programs and data stored on persistent non-transitory storage 84. By accessing serial port 96, portable display device 108 can access the low-level interface of management processor 88, which may comprise a simple terminal data stream. The low-level interface may be used to initialize network parameters. Finally, by accessing network port 98, portable display device 108 may have access to high-level functionality of management processor 88 that is only provided via network port 98. Also note that management processor 88 may signal an operator, via indicator light 110, to connect portable display device 108 to bezel 104 so that management processor 88 may provide additional status information. For example, indicator light 110 could emit a solid green light when the status is OK, and a blinking red light when attention is needed. Note that indicator light 110 may incorporate multiple illumination devices for providing light output having different colors. Of course, additional indicator lights and other signaling devices may also be provided.

Note that the data connections in the previous figures may be provided by other methods known in the art, such as universal serial bus (USB), IEEE 1394 (Firewire), or I²C connections. Furthermore, wireless connections may be used, such as Bluetooth, 802.11a, 802.11b, 802.11n, and wireless USB connections. Finally, power could be provided by a wireless inductive connection.

Figure 11:
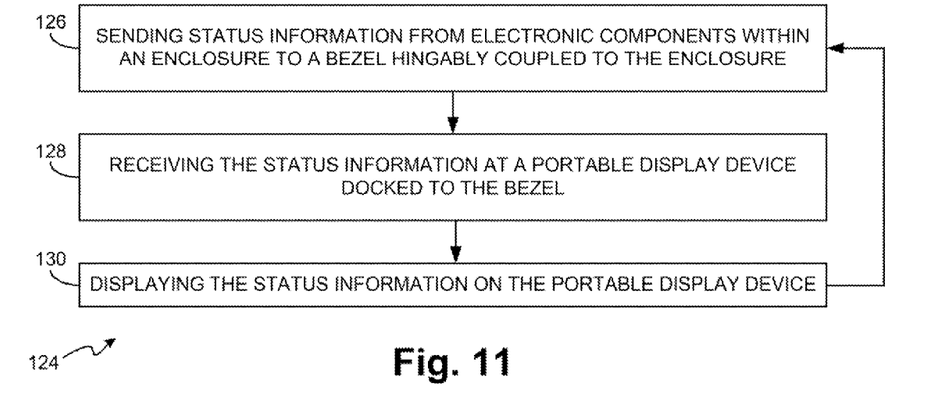
FIGS. 11 and 12 are flowcharts illustrating example methods.

FIG. 11 is a flowchart 124 that shows an example method. Flowchart 124 begins at block 126, where status information is sent from electronic components within an enclosure to a bezel hingably coupled to the enclosure. Control passes to block 128.

At block 128, the status information is received at a portable display device docked to the bezel. Control passes to block 130, and at block 130, the status information is displayed on the portable display device. Control passes back to block 126, and flowchart 124 repeats.

Figure 12:
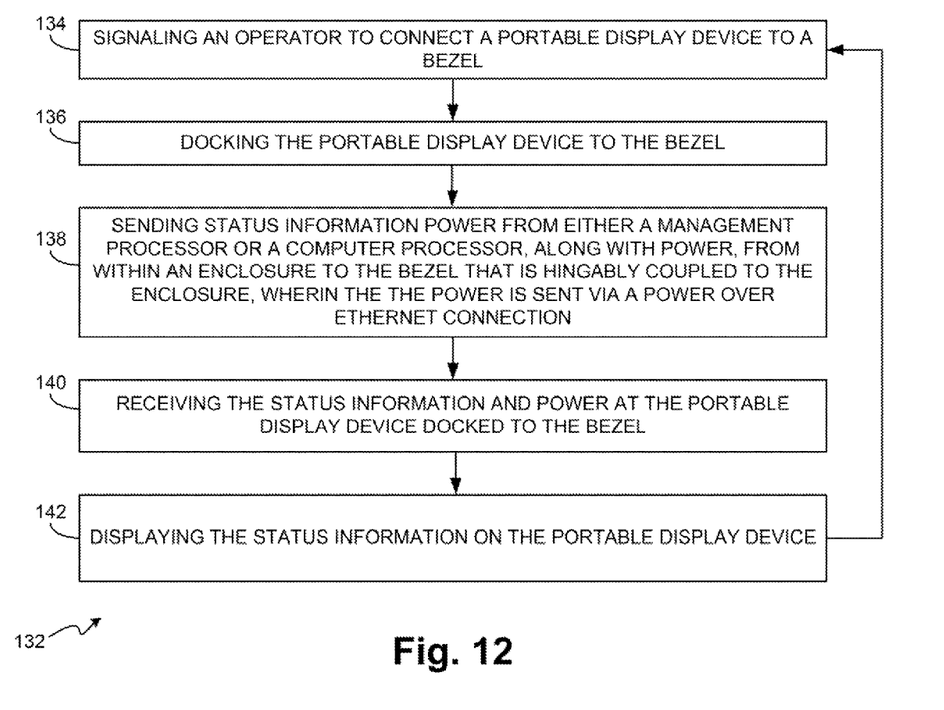

FIG. 12 is a flowchart 132 that shows another example method. Flowchart 132 begins at block 134, where an operator is signaled to connect a portable display device to a bezel. Control passes to block 136, where the operator docks the portable device to the bezel. Control passes to block 138.

At block 138, status information is sent from either a management processor or a computer processor, either of which may reside in an enclosure. In addition, power is sent from within the enclosure, with the power being transmitted via a Power over Ethernet connection. Control passes to block 140.

At block 140, the status information is received at a portable display device that is docked to the bezel. Control passes to block 142, where the status information is displayed on the portable display device. Control passes back to block 134, and flowchart 132 repeats.

In the examples disclosed herein, a portable display device dock is provided on a bezel that is hingably coupled to an enclosure. By having the bezel hingably coupled to the enclosure, components behind the bevel can be accessed by rotatably moving the bezel to expose the components. By providing a portable display dock, a portable display device may be coupled to the bezel to provide additional status information from components operating inside the enclosure. System costs are reduced because a display does not need to be provided for each system. For example, in a data center having 100 computer systems, five portable display devices may prove adequate to retrieve status information form the computer systems. Basic information can be provided by simple indicator lights, and the basic information can include a signal to couple a portable display device to the computer system.

In the foregoing description, numerous details are set forth to provide an understanding of the examples. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the true spirit and scope of the examples.

What is claimed is:

1. A system comprising:
   an enclosure comprising a front side of the enclosure and an interior space, the interior space comprising electronic components that include a status reporting unit, wherein the front side comprises:
   a bezel rotatably coupled to the front side;
   vent openings; and
   components that include an optical drive and a removable portable display device; and
   a hinge connected to the bezel and the front side, wherein:
   the bezel rotates between a first position parallel to the front side of the enclosure and a second position at an angle from the front side of the enclosure;
   in the first position, the optical drive is covered by the bezel and the vent openings are exposed; and
   in the second position, the optical drive is accessible; and
   the bezel includes a portable display device dock that:
   receives the removable portable display device, wherein the removable portable display device is removable from the portable display device dock of the bezel; and
   retains the portable display device to the bezel when inserted; and
   wherein the status reporting unit transmits the status of the electronic components inside the enclosure to the portable display device for displaying the status.

2. The system of claim 1 and further comprising:
   a power connector associated with the removable portable display device dock and connectable to a component within the enclosure, for providing power to the removable portable display device when the removable portable display device is installed in the portable display device dock.

3. The system of claim 1 and further comprising:
   a data connector associated with the removable portable display device dock and connectable to a component within the enclosure, for providing data to the removable portable display device when the removable portable display device is installed in the portable display device dock.

4. The system of claim 1 and further comprising:
   an indicator light; and
   a connection from the indicator light that is connectable to a component within the enclosure, for allowing a system within the enclosure to cause a status indication to be displayed by the indicator light.

5. The bezel of claim 1, wherein the portable display device dock is carried by the bezel such that the portable display device dock pivots with the bezel during rotation of the bezel as facilitated by the hinge component.

6. A system comprising:
   an enclosure comprising a front side of the enclosure and an interior space, the interior space comprising electronic components that include a status reporting unit that reports a system status to a removable portable display device, and the front side comprising:
   components that include an optical drive and a removable display device;
   vent openings; and
   a bezel comprising:
   a face plate; and
   a portable display dock that receives the removable portable display; and
   wherein the status reporting unit transmits a status of the electronic components to the portable display to be displayed; and
   a hinge coupling the bezel to the front side of the enclosure, wherein the bezel is rotatably coupled to the hinge in a first position parallel to the front side of the enclosure and a second position at an angle from the front side of the enclosure;
in a first position, the optical drive is covered by the bezel and the vent openings are exposed; and
in a second position, the optical drive is accessible.

7. The system of claim 6 and further comprising a power connection between the electronic components and the removable portable display dock.

8. The system of claim 6 and further comprising a data connection between the status-reporting unit and the portable display dock.

9. The system of claim 8 wherein the data connection is an RS-232 serial connection.

10. The system of claim 6 and further comprising a power-over-Ethernet (PoE) connection between the status-reporting unit and the portable display dock.

11. The system of claim 6 wherein the bezel includes an indicator light, and the system includes a connection between the indicator light to the status-reporting unit.

12. The system of claim 6 and further comprising the removable portable display device installed in the portable display device dock.

13. The system of claim 12 wherein the removable portable display device includes a battery.

14. The system of claim 6 wherein the electronic components comprising a computer system and the status-reporting unit comprises a management processor of the computer system.

15. The system of claim 6 wherein the electronic components comprise a computer system that includes a processor, an I/O hub, persistent non-transitory storage, and memory, the status-reporting unit comprises code stored on the persistent non-transitory storage and executed by the processor from the memory, and the portable display device dock is coupled to the I/O hub.

16. A method of displaying status information comprising:
sending the status information of electronic components from the electronic components of a server computer in an interior space of an enclosure to a bezel hingably coupled to the front side of the enclosure, wherein the front side includes:
components that include an optical drive and a removable portable display device; and
vent openings;
receiving the status information at the removable portable display device docked to the bezel, wherein the removable portable display device:
is removable from the bezel; and
receives power and data only from the enclosure and does not operate without being connected to the enclosure;
moving the bezel between a first position where the bezel is parallel to the front side of the enclosure and a second position where the bezel is at an angle from the front side of the enclosure, wherein: in the first position, the optical drive is covered by the bezel and the vent openings are exposed; and
in the second position, the optical drive is accessible; and
displaying the status information on the removable portable display device.

17. The method of claim 16 and further comprising:
signaling an operator to connect the removable portable display device to the bezel; and
docking the removable portable display device to the bezel.

18. The method of claim 16 wherein sending the status information from electronic components within an enclosure to the bezel hingably coupled to the enclosure comprises sending the status information from a management processor within an enclosure to a bezel hingably coupled to the enclosure.

19. The method of claim 16 wherein sending the status information from electronic components within an enclosure to the bezel hingably coupled to the enclosure comprises sending the status information from a computer processor within an enclosure to a bezel hingably coupled to the enclosure.

20. The method of claim 16 wherein sending the status information from electronic components within an enclosure to the bezel hingably coupled to the enclosure includes sending power.

21. The method of claim 16 wherein the electronic components are connected to the bezel through a Power over Ethernet connection.

* * * * *